(12) United States Patent
Maruhashi (10) Patent No.: US 9,634,897 B2
(45) Date of Patent: Apr. 25, 2017

(54) COMMUNICATION APPARATUS OPERABLE IN AUTO-NEGOTIATION MODE, METHOD OF CONTROLLING THE COMMUNICATION APPARATUS, AND STORAGE MEDIUM

(71) Applicant: CANON KABUSHIKI KAISHA, Tokyo (JP)

(72) Inventor: Kazuaki Maruhashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/890,454

(22) Filed: May 9, 2013

(65) Prior Publication Data
US 2013/0301449 A1 Nov. 14, 2013

(30) Foreign Application Priority Data
May 10, 2012 (JP) .................................. 2012-108431

(51) Int. Cl.
| H04L 12/24 | (2006.01) |
| H04L 5/14 | (2006.01) |
| H04L 12/12 | (2006.01) |
| H04L 5/16 | (2006.01) |

(52) U.S. Cl.
CPC ........ *H04L 41/0876* (2013.01); *H04L 5/1438* (2013.01); *H04L 5/16* (2013.01); *H04L 12/12* (2013.01); *Y02B 60/34* (2013.01); *Y02B 60/35* (2013.01)

(58) Field of Classification Search
USPC ......... 370/252, 311; 455/343.2, 343.3, 343.4
See application file for complete search history.

(56) References Cited

U.S. PATENT DOCUMENTS

| 6,457,055 B1 * | 9/2002 | Hwong ............. H04L 12/40136 370/242 |
| 6,791,942 B2 | 9/2004 | Jin |

(Continued)

FOREIGN PATENT DOCUMENTS

| CN | 101547281 A | 9/2009 |
| CN | 102480301 A | 5/2012 |

(Continued)

OTHER PUBLICATIONS

Wayback machine, entry for autonegotiation, Oct. 30, 2011, (web.archive.org/web/20111030164755/http://en.wikipedia.org/wiki/Autonegotiation), p. 1.*

European Search Report issued in European counterpart application No. EP13167217.2, dated Aug. 5, 2013.

Notice on the First Office Action issued in corresponding CN201310170081.5, dated Feb. 28, 2015. English translation provided.

(Continued)

*Primary Examiner* — Andrew Chriss
*Assistant Examiner* — Jose L Perez
(74) *Attorney, Agent, or Firm* — Rossi, Kimms & McDowell LLP (57) ABSTRACT

A communication apparatus capable of activating an EEE power saving mode when not activated. The communication apparatus is operable in an auto-negotiation mode. When a CPU of the communication apparatus determines that a power saving mode to be realized in the auto-negotiation mode is to be activated, if an other-party apparatus at the other end of communication has been set to a fixed mode, the CPU causes the other-party apparatus to be set to the auto-negotiation mode.

24 Claims, 9 Drawing Sheets

(56) References Cited

U.S. PATENT DOCUMENTS

| | | | |
|---|---|---|---|
| 7,577,857 B1* | 8/2009 | Henderson | G06F 1/3203 713/320 |
| 7,616,587 B1 | 11/2009 | Lo et al. | |
| 8,199,672 B1* | 6/2012 | Nachum et al. | 370/254 |
| 2005/0097378 A1* | 5/2005 | Hwang | 713/320 |
| 2009/0248890 A1* | 10/2009 | Shouno | H04N 1/00204 709/232 |
| 2010/0241880 A1* | 9/2010 | Wertheimer et al. | 713/310 |
| 2011/0047446 A1* | 2/2011 | Fukuyama | H04L 5/1438 714/807 |
| 2011/0191608 A1* | 8/2011 | Vetteth | G06F 1/32 713/310 |
| 2011/0216343 A1 | 9/2011 | Shouno | |
| 2012/0017105 A1 | 1/2012 | Thyni et al. | |

FOREIGN PATENT DOCUMENTS

| | | | |
|---|---|---|---|
| JP | 2003258939 A | 9/2003 | |
| JP | 3945288 B2 | 7/2007 | |
| JP | 2010141426 A | 6/2010 | |
| JP | 2011044955 A | 3/2011 | |
| KR | 1020040038918 A | 5/2004 | |

OTHER PUBLICATIONS

Office Action issued in JP2012-108431, mailed Feb. 9, 2016.
Office Action issued in KR10-2013-0049740, mailed Oct. 13, 2015.
Notice of Allowance issued in Korean Appln. No. 10-2013-0049740 mailed Jun. 17, 2016. English translation provided.

* cited by examiner

COMMUNICATION APPARATUS OPERABLE IN AUTO-NEGOTIATION MODE, METHOD OF CONTROLLING THE COMMUNICATION APPARATUS, AND STORAGE MEDIUM

BACKGROUND OF THE INVENTION

Field of the Invention

The present invention relates to a communication apparatus, a method of controlling the same, and a storage medium.

Description of the Related Art

In an apparatus, such as a printer, a multifunction machine, or a PC (personal computer), which is provided with a LAN network interface, the settings of the communication mode of a PHY device, which is a physical layer of the LAN network interface, include a setting of a maximum communication speed and a setting of a communication method.

The maximum communication speed is represented by a maximum bit rate per unit time, such as 100 Mbps or 10 Mbps, at which physical transmission of data can be performed. The communication method includes a full-duplex communication method in which two-way simultaneous communication is possible and a half-duplex communication method in which only one of two apparatuses connected to each other can perform transmission.

Further, generally, the settings of the communication mode of the PHY device include a setting of an auto-negotiation mode and a setting of a fixed mode. The auto-negotiation mode is a method in which PHY setting information called FLP (fast link pulse) is exchanged between two apparatuses when establishing a connection therebetween, whereby a common and fastest mode is automatically set by being selected from communication speeds and communication methods that can be set between the two apparatuses.

In this case, a highest maximum bit rate is adopted as the maximum communication speed, and the full-duplex communication method is preferentially adopted as the communication method.

By connecting two apparatuses operable in the auto-negotiation mode to each other by a LAN cable, it is possible to automatically select a maximum communication speed and a communication method which can be set between the two apparatuses and ensures a fastest communication, without the user being conscious thereof.

On the other hand, in the fixed mode, parameters of the maximum communication speed and the communication method are fixedly set irrespective of the settings of an other-party apparatus at the other end of communication.

As for connection between an apparatus that operates in the auto-negotiation mode and an apparatus that operates in the fixed mode, it is determined by the standard of IEEE 802.3 that the half-duplex communication method is to be employed for the connection.

For this reason, in the case of establishing a connection between an apparatus that operates in the fixed mode with the communication method set to the full-duplex communication method and an apparatus that operates in the auto-negotiation mode, the communication method of the apparatus that operates in the fixed mode is set to the full-duplex communication method and the communication method of the apparatus that operates in the auto-negotiation mode is set to the half-duplex communication method.

As a result, packet collision occurs due to the connection established using both the full-duplex communication method and the half-duplex communication method, which frequently causes packet retransmission, resulting in degradation of packet transmission efficiency.

To solve the above-described problem, there has been proposed a method in which, when delay in response to a particular packet is detected, if an apparatus that operates in the auto-negotiation mode is connected using the half-duplex communication method, the communication setting of the apparatus is changed to the fixed mode with the communication method set to the full-duplex communication method or the half-duplex communication method (see e.g. Japanese Patent No. 3945288).

However, in the method proposed in Japanese Patent No. 3945288, when an apparatus is set to the fixed mode, the apparatus cannot shift to an EEE (Energy Efficient Ethernet (registered trademark)) power saving mode defined by IEEE 802.3az.

In EEE, shifting of a LAN interface to the power saving mode is allowed only when apparatuses connected to each other employ the auto-negotiation mode, and the method proposed in Japanese Patent No. 3945288 in which the communication mode is changed to the fixed mode does not allow the LAN interface of the apparatuses to shift to the power saving mode.

This is because the two apparatuses notify each other of whether or not the self apparatus is set to the EEE power saving mode through negotiation during link establishment between them in the auto-negotiation mode. Therefore, when both of the two apparatuses are not operating in the auto-negotiation mode, it is impossible to shift to the EEE power saving mode.

SUMMARY OF THE INVENTION

The present invention provides a communication apparatus that executes processing for activating an EEE power saving mode when the EEE power saving mode is not activated because the communication apparatus and an other-party apparatus communicating with each other are not both operating in an auto-negotiation mode, a method of controlling the communication apparatus, and a storage medium.

In a first aspect of the present invention, there is provided a communication apparatus operable in an auto-negotiation mode, comprising a first setting unit configured to set whether or not to activate a power saving mode to be realized by the auto-negotiation mode, a first determination unit configured, in a case where the first setting unit has set that the power saving mode is to be activated, to determine whether an external apparatus at the other end of communication has been set to a fixed mode, and a control unit configured, in a case where the first determination unit determines that the external apparatus has been set to the fixed mode, to cause the external apparatus to be set to the auto-negotiation mode.

In a second aspect of the present invention, there is provided a communication apparatus operable in an auto-negotiation mode, comprising a first setting unit configured to set whether or not to activate a power saving mode to be realized by the auto-negotiation mode, and a control unit configured, in a case where the first setting unit has set that the power saving mode is to be activated, to cause the communication apparatus to be set to the auto-negotiation mode.

In a third aspect of the present invention, there is provided a method of controlling a communication apparatus operable in an auto-negotiation mode, comprising setting whether or not to activate a power saving mode to be realized by the auto-negotiation mode, determining, when said setting has set that the power saving mode is to be activated, whether an external apparatus at the other end of communication is set to a fixed mode, and causing, in a case where the determining determines that the external apparatus has been set to the fixed mode, the external apparatus to be set to the auto-negotiation mode.

In a fourth aspect of the present invention, there is provided a method of controlling a communication apparatus operable in an auto-negotiation mode, comprising setting whether or not to activate a power saving mode to be realized by the auto-negotiation mode, and causing, in a case where said setting has set that the power saving mode is to be activated, the communication apparatus to be set to the auto-negotiation mode.

In a fifth aspect of the present invention, there is provided a non-transitory computer-readable storage medium storing a computer-executable program for causing a computer to execute a method of controlling a communication apparatus operable in an auto-negotiation mode, comprising setting whether or not to activate a power saving mode to be realized by the auto-negotiation mode, determining, when said setting has set that the power saving mode is to be activated, whether an external apparatus at the other end of communication has been set to a fixed mode, and causing, in a case where the determining determines that the external apparatus has been set to the fixed mode, the external apparatus to be set to the auto-negotiation mode.

In a sixth aspect of the present invention, there is provided a non-transitory computer-readable storage medium storing a computer-executable program for causing a computer to execute a method of controlling a communication apparatus operable in an auto-negotiation mode, comprising setting whether or not to activate a power saving mode to be realized by the auto-negotiation mode, and causing, in a case where said setting has set that the power saving mode is to be activated, the communication apparatus to be set to the auto-negotiation mode.

According to the present invention, it is possible to provide a communication apparatus that executes processing for enabling the EEE power saving mode when the EEE power saving mode is not activated because the communication apparatus and the other-party apparatus communicating with each other are not both operating in the auto-negotiation mode, a method of controlling the communication apparatus, and a storage medium.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
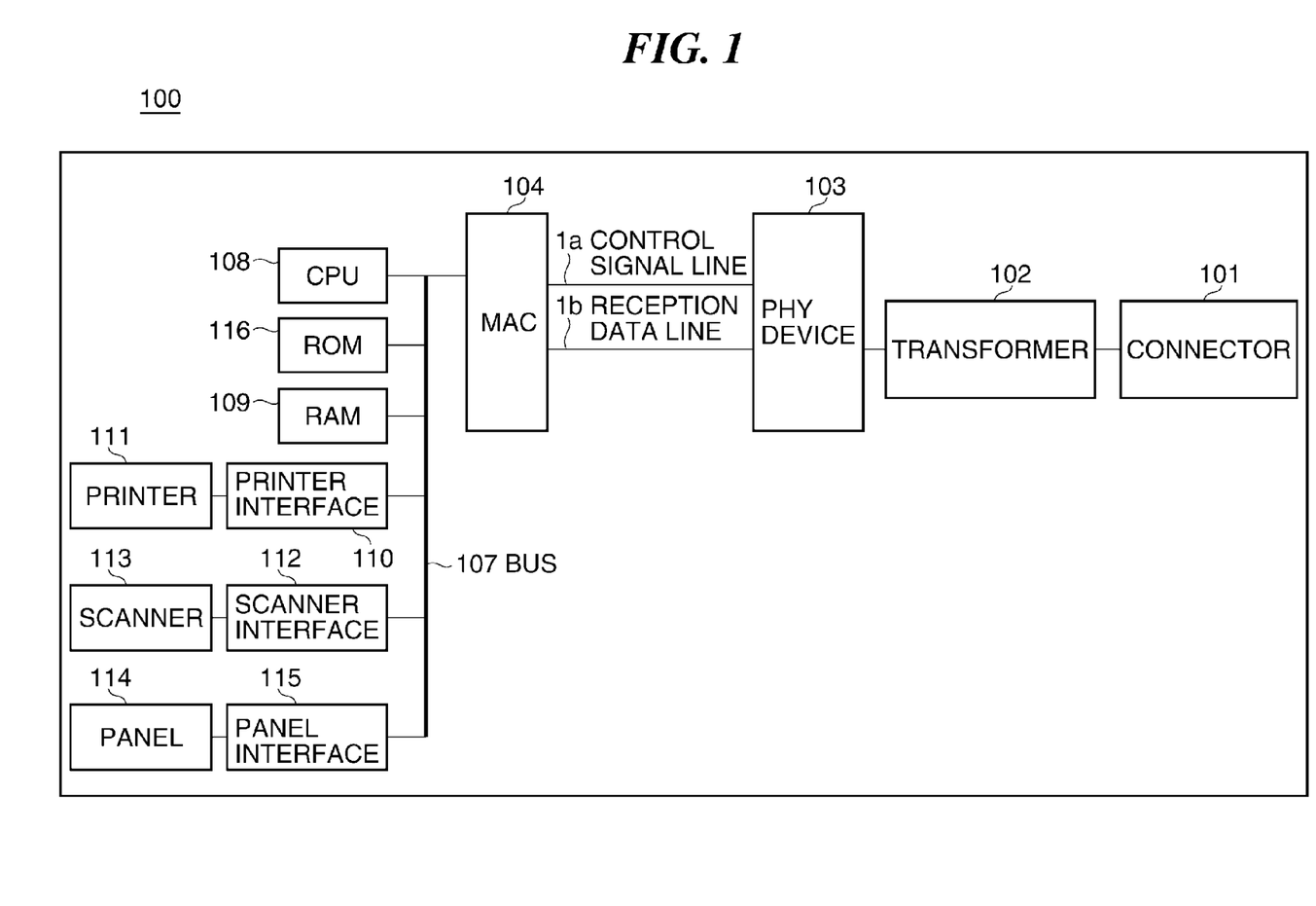
FIG. 1 is a schematic diagram of a communication apparatus according to a first embodiment of the present invention.

FIG. 1 is a diagram of a communication apparatus 100 according to a first embodiment of the present invention.

Referring to FIG. 1, a connector 101 is for connecting to a modular plug of a LAN cable so as to connect the communication apparatus 100 to an external network apparatus via the LAN cable. A transformer 102 electrically isolates the communication apparatus 100 from a network. A PHY device 103 is an LSI that connects the communication apparatus 100 to an external network apparatus. The PHY device 103 can be configured to operate in an auto-negotiation mode in which according to an other-party apparatus at the other end of communication, a communication speed can be set and the communication mode can be switched between a full-duplex communication mode and a half-duplex communication mode. This auto-negotiation mode makes it possible to realize an EEE (Energy Efficient Ethernet (registered trademark)) power saving mode defined by IEEE 802.3az. In a case where the EEE power saving mode is activated, when the amount of communication performed during a predetermined time period has become equal to or smaller than a predetermined value, power saving is achieved by reducing or cutting off the supply of power to a MAC (media access controller) 104 or reducing the maximum communication speed of the PHY device 103.

The MAC 104 converts a signal received by the PHY device 103 to a signal to be handled by devices of the communication apparatus 100. A CPU 108 controls the overall operation of the communication apparatus 100.

A RAM 109 temporarily stores e.g. programs to be executed by the CPU 108. A ROM 116 stores settings, initial data, etc. of the communication apparatus 100.

A printer 111 prints characters and images. A scanner 113 scans characters and images. A panel 114 (display section) is used to display information on the communication apparatus 100, an input command from a user, and so forth.

A printer interface 110 provides interface between the printer 111 and the devices of the communication apparatus 100. A scanner interface 112 provides interface between the scanner 113 and the devices of the communication apparatus 100.

The printer interface 110 and the scanner interface 112 perform data transmission and reception to and from the printer 111 and the scanner 113, respectively, according to programs executed by the CPU 108.

A panel interface 115 provides interface between the panel 114 and the devices of the communication apparatus 100. The panel interface 115 transfers commands input by the user via the panel 114 to the CPU 108. Further, the panel interface 115 causes the panel 114 to display contents indicative of commands from the CPU 108.

A bus 107 electrically connects between the devices of the communication apparatus 100. A control signal line 1a is a signal line for use in transmitting setting information and control signals from the CPU 108 between the MAC 104 and the PHY device 103.

A reception data line 1b is a signal line for use in transmitting packets received by the PHY device 103 from a communication line to the MAC 104.

A received packet reaches the PHY device 103 via the transformer 102. A maximum communication speed of physical communication with an external network apparatus is set in the PHY device 103. The packet received by the PHY device 103 is passed on by the MAC 104, and is then transferred through the bus 107, to be properly processed according to a program executed by the CPU 108.

The maximum communication speed set in the PHY device 103 is notified to the CPU 108 via the control signal line 1a. The maximum communication speed of the PHY device 103 can also be set by the CPU 108.

Figure 2:
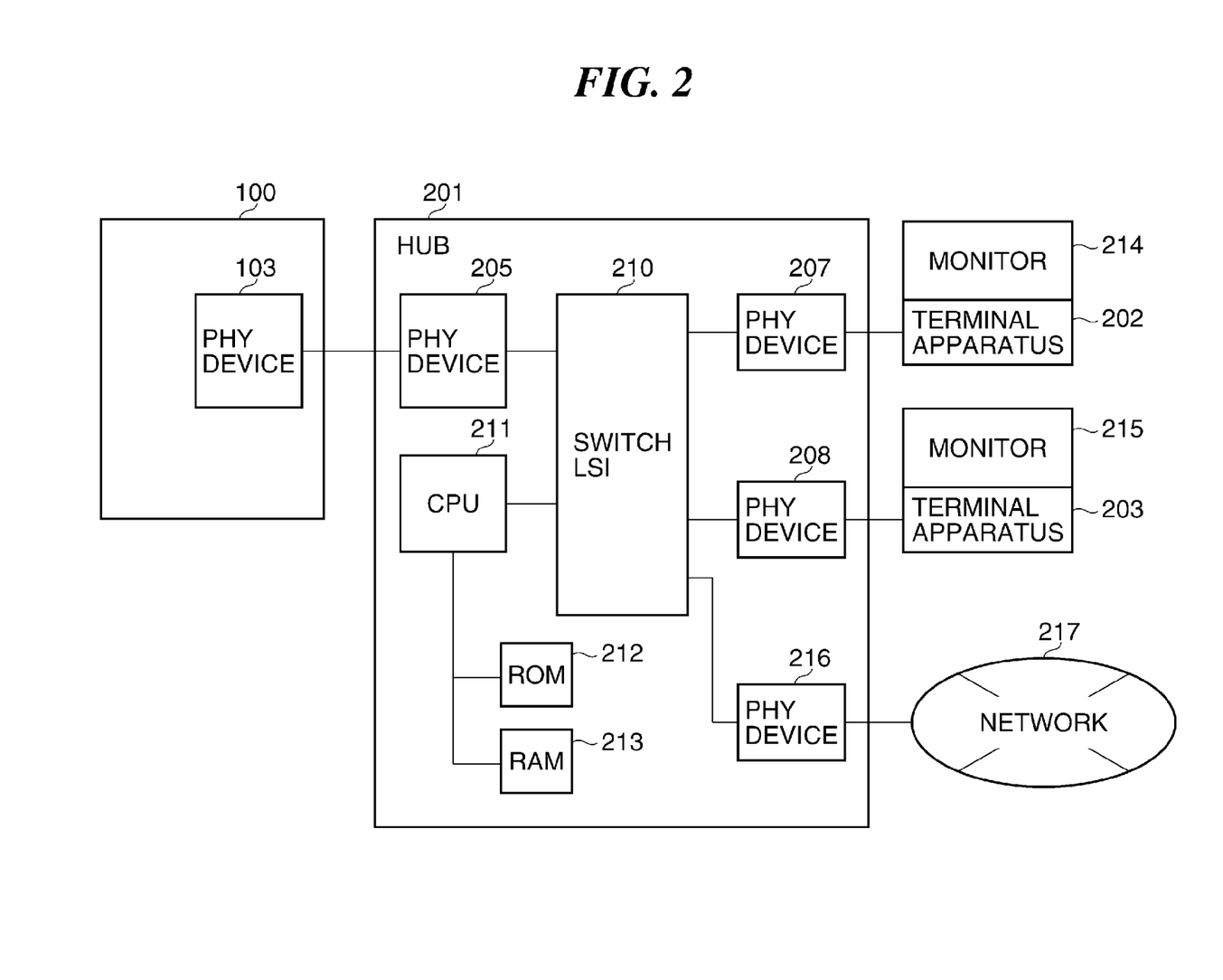
FIG. 2 is a diagram of an example of connection between the communication apparatus in FIG. 1 and external network apparatuses.

FIG. 2 is a diagram of an example of connection between the communication apparatus 100 in FIG. 1 and external network apparatuses.

In the example in FIG. 2, the communication apparatus 100, a HUB 201, terminal apparatuses 202 and 203, and a network 217 are connected to each other.

The HUB 201 can be connected with a plurality of LAN cables, and is capable of exchanging and broadcasting packets. PHY devices 205, 207, 208, and 216 are provided to connect between the HUB 201 and the external network apparatuses, and each of the PHY devices 205, 207, 208, and 216 has functions equivalent to those of the PHY device 103 described with reference to FIG. 1.

The PHY device 205 is connected to the communication apparatus 100, the PHY device 207 to the terminal apparatus 202, the PHY device 208 to the terminal apparatus 203, and the PHY device 216 to the network 217.

A switch LSI 210 has a function of transferring packets received by the respective PHY devices 205, 207, 208, and 216.

A CPU 211 controls the overall operation of the HUB 201. In particular, the CPU 211 instructs each of the PHY devices 205, 207, 208, and 216 and the switch LSI 210 e.g. to change settings.

A RAM 213 temporarily stores e.g. programs to be executed by the CPU 211. A ROM 212 stores settings, initial data, etc. of the HUB 201.

Note that the terminal apparatuses 202 and 203 and the communication apparatus 100 are allowed to request the CPU 211 to change settings of the PHY devices 205, 207, and 208, and the switch LSI 210.

Particularly when the HUB 201 has a program for changing the settings of the HUB 201 from a Web browser, the program is stored in the ROM 212. This program makes it possible to change the settings of the HUB 201 from the communication apparatus 100 or the terminal apparatus 202 or 203.

Specifically, the HUB 201 is configured such that settings of the PHY devices 205, 207, and 208, and the switch LSI 210 can be changed by instructions from the communication apparatus 100 and the terminal apparatuses 202 and 203 via respective Web browsers.

The terminal apparatuses 202 and 203 request the communication apparatus 100 to execute printing or scanning. Monitors 214 and 215 are connected to the respective terminal apparatuses 202 and 203 to display information from the apparatuses 202 and 203, respectively.

Figure 3:
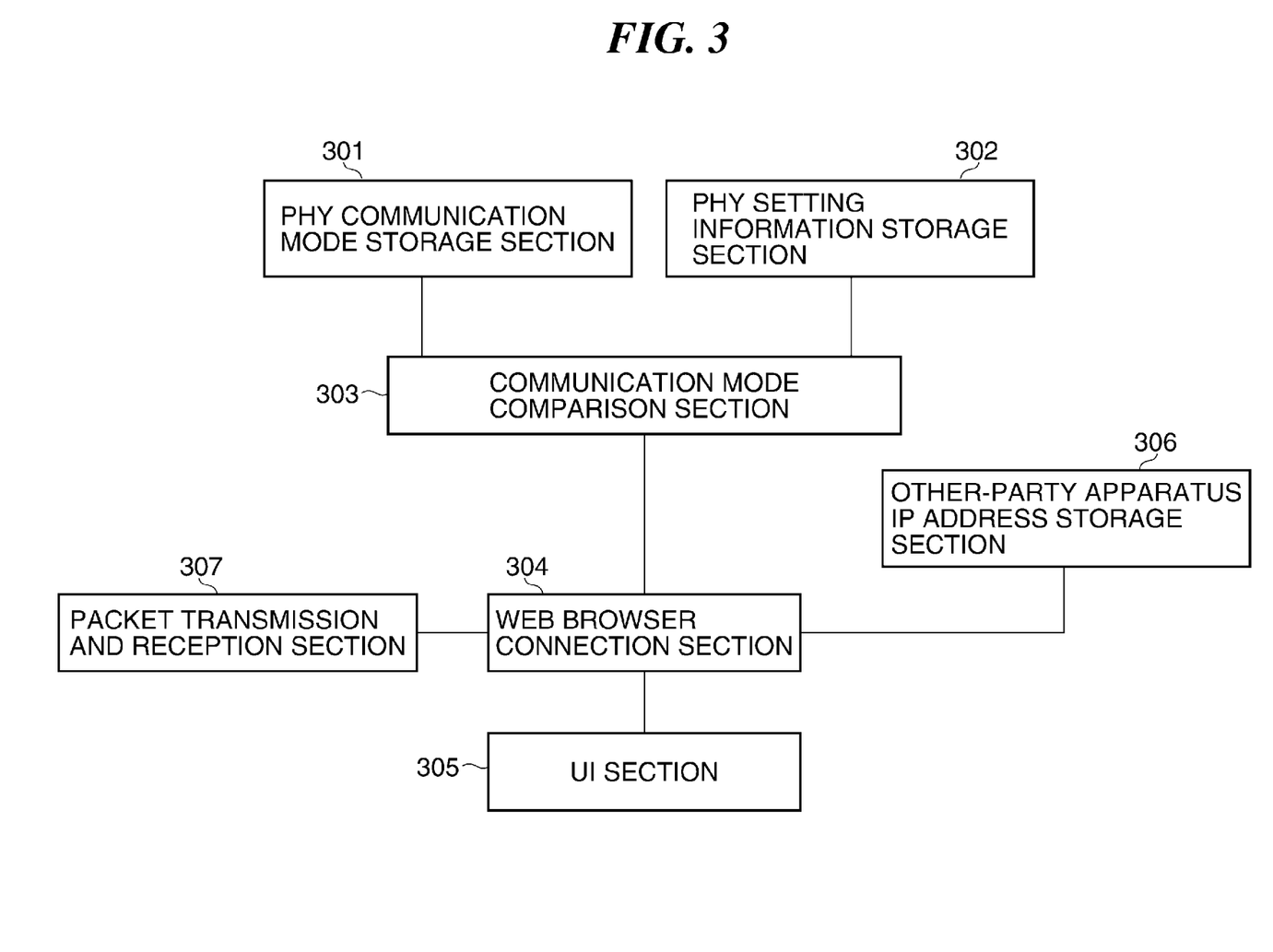
FIG. 3 is a diagram showing the software configuration of the communication apparatus in FIG. 1.

FIG. 3 is a diagram showing the software configuration of the communication apparatus 100 in FIG. 1.

The software modules of the communication apparatus 100 shown in FIG. 3 include a PHY communication mode storage section 301, a PHY setting information storage section 302, a communication mode comparison section 303, a Web browser connection section 304, a user interface section 305, an other-party apparatus IP address storage section 306, and a packet transmission and reception section 307.

Referring to FIG. 3, the PHY communication mode storage section 301 stores information indicative of whether the PHY device 103 is performing communication by the full-duplex communication method or the half-duplex communication method.

The PHY setting information storage section 302 stores information indicative of whether the PHY device 103 is set to a fixed mode or the auto-negotiation mode.

The communication mode comparison section 303 performs comparison between the information stored in the PHY communication mode storage section 301 and the information stored in the PHY setting information storage section 302.

In the present embodiment, the other-party apparatus IP address storage section 306 stores the IP address of the HUB 201. The IP address stored in the other-party apparatus IP address storage section 306 can be stored in the ROM 116 by user's operation on the panel 114. Further, when the IP address of the HUB 201 is input by the user from the panel 114, it is possible to store the input IP address in the other-party apparatus IP address storage section 306 via the user interface section 305 and the Web browser connection section 304.

The packet transmission and reception section 307 transmits and receives packets to and from the HUB 201. The Web browser connection section 304 decodes a program provided by the HUB 201 so as to change settings from the Web browser, and encodes commands input by the user from the Web browser.

The user interface section 305 displays, on the panel 114, information obtained through decoding by the Web browser connection section 304. Further, the user interface section 305 transmits a command received from the panel 114 to the Web browser connection section 304.

In the above-described software configuration of the communication apparatus 100, let it be assumed that the information stored by the PHY setting information storage section 302 indicates the auto-negotiation mode and the information stored by the PHY communication mode storage section 301 indicates the full-duplex communication method.

In this case, it is presumed that the PHY device 205 of the HUB 201 connected to the PHY device 103 is set to the auto-negotiation mode. Therefore, if the HUB 201 also supports EEE, it is possible to shift to the power saving mode.

Let it be assumed, on the other hand, that the information stored by the PHY setting information storage section 302 indicates the auto-negotiation mode and the information stored by the PHY communication mode storage section 301 indicates the half-duplex communication method.

In this case, it is presumed that the PHY device 205 of the HUB 201 connected to the PHY device 103 is set to the fixed mode or an auto-negotiation mode which disables operation in the full-duplex communication method.

In general, however, a PHY device is configured to be usable in the full-duplex communication method when set to the auto-negotiation mode. Therefore, in the present case, there is a high possibility that the PHY device 205 of the HUB 201 has been set to the fixed mode.

Therefore, in this case, the communication mode comparison section 303 detects a mismatch between the communication modes and notifies the Web browser connection section 304 of the communication mode mismatch. At this time, it is possible to execute one of two kinds of processing in the present embodiment, and therefore the two kinds of processing will be described hereafter.

In the first processing, when notified of the communication mode mismatch, the Web browser connection section 304 displays, on the panel 114, contents indicating that it is impossible to shift to the power saving mode, via the user interface section 305. The mismatch in settings of the communication mode between the instant apparatus and the other-party apparatus can be explicitly shown in the contents.

Further, when notified of the communication mode mismatch, the Web browser connection section 304 acquires the IP address of the HUB 201 from the other-party apparatus IP address storage section 306.

Thereafter, the Web browser connection section 304 acquires the program for changing settings of the HUB 201 from the Web browser, via the packet transmission and reception section 307, and displays a Web browser on the panel 114 via the user interface section 305.

By operating the Web browser displayed on the panel 114, the user can change the setting of the communication mode of the PHY device 205 of the HUB 201 to the auto-negotiation mode, whereafter the HUB 201 and the communication apparatus 100 can be connected to each other in the auto-negotiation mode.

Further, it is also possible to change the settings of the communication mode of the PHY device 207 and the PHY device 208, which are not connected to the communication apparatus 100, if it is possible to operate the HUB 201 via the Web browser. This makes it possible to perform operations for causing communication using the other PHY devices as well to shift to the power saving mode.

As described above, even when a communication mode mismatch occurs, it is possible to shift to the power saving mode by changing the communication mode to the auto-negotiation mode.

Next, the second processing will be described. In the second processing, when notified of the communication mode mismatch, the Web browser connection section 304 directly requests the CPU 211 of the HUB 201 to change of the communication mode without acquiring the program for changing the setting from the Web browser. More specifically, when it is determined that the other-party apparatus connected to the communication apparatus 100 is set to the fixed mode, the other-party apparatus is caused to operate in the auto-negotiation mode.

In this case, when a command for changing the communication mode of the PHY device 205 to the auto-negotiation mode is transmitted to the HUB 201 via the packet transmission and reception section 307, the CPU 211 of the HUB 201 changes the setting of the communication mode of the PHY device 205 to the auto-negotiation mode according to the command.

This makes it possible to automatically change the communication mode of the PHY device 205 of the HUB 201 to the auto-negotiation mode without requiring operation on the panel 114. Further, similarly to the first processing, it is also possible to change the communication modes of the respective PHY devices 207 and 208 which are not connected to the communication apparatus 100. This makes it possible to perform an operation for additionally causing the other PHY devices to shift to the power saving mode.

These two kinds of processing enable even a user unfamiliar with the operation of a LAN to perform setting change for causing a shift to the power saving mode.

Figure 4A:
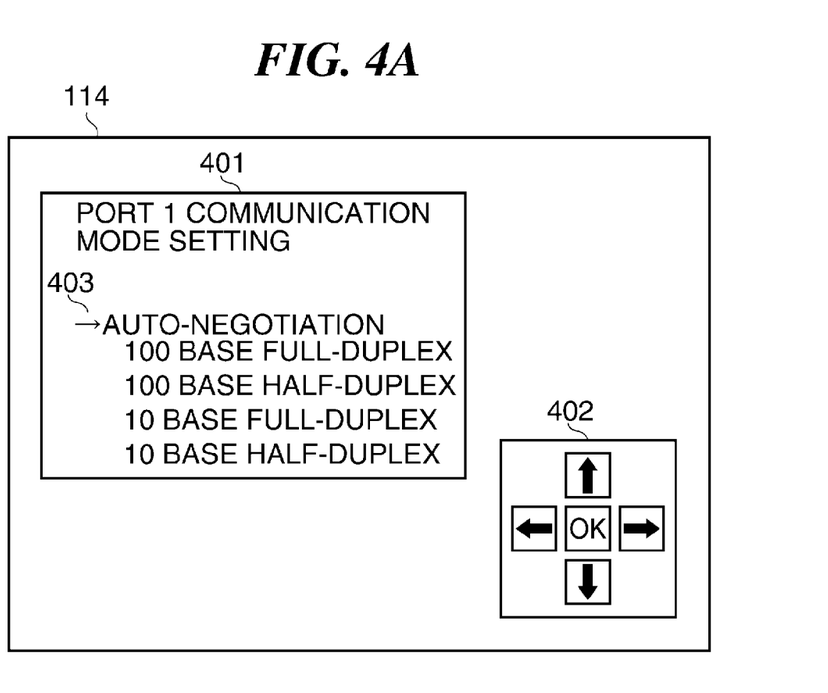
FIG. 4A is a view of an example of contents displayed on a panel appearing in FIG. 1.
Figure 4B:
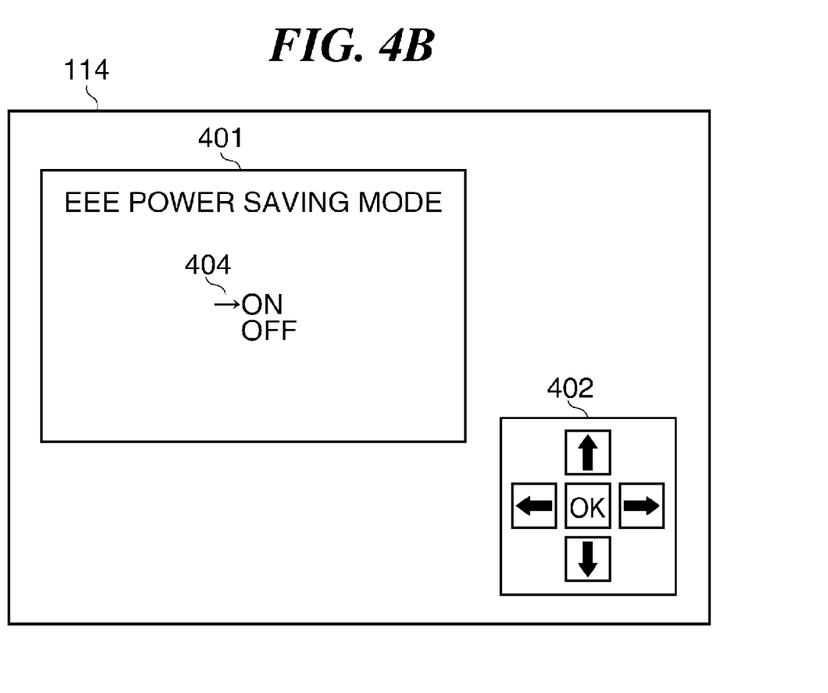
FIG. 4B is a view of another example of contents displayed on the panel appearing in FIG. 1.

FIGS. 4A and 4B are views illustrating examples of contents displayed on the panel 114 appearing in FIG. 1, respectively.

Referring to FIGS. 4A and 4B, the panel 114 comprises an LCD 401 (display section) for displaying information for the user and a selection button 402 (input section) for enabling the user to input a command.

On the LCD 401, there are displayed the above-mentioned browser and the like. The user can input a command to the communication apparatus 100 by operating the selection button 402 according to contents displayed on the LCD 401.

When a touch panel is used for the LCD 401, the user can perform input operation by directly touching the LCD 401.

Note that in each of the terminal apparatuses 202 and 203 as well, by using the monitor 214 or 215, it is possible to display a browser and perform an input operation, similarly to the communication apparatus 100.

FIG. 4A shows a setting screen for selectively setting whether or not to cause the communication apparatus 100 to operate in the auto-negotiation mode. When the user selects "auto-negotiation" from a menu 403 using the selection button 402, the CPU 108 of the communication apparatus 100 determines that the auto-negotiation mode is set. On the other hand, when the user selects any other option than "auto-negotiation" from the menu 403 using the selection button 402, the CPU 108 of the communication apparatus 100 determines that the auto-negotiation mode has not been set, but a fixed mode corresponding to the communication mode selected by the user is set.

FIG. 4B shows a setting screen for selectively setting whether or not to cause the communication apparatus 100 to operate in the EEE power saving mode. When the user selects "ON" from options 404 using the selection button 402, the CPU 108 of the communication apparatus 100 determines that the EEE power saving mode is set. On the other hand, when the user selects "OFF" from the options 404 using the selection button 402, the CPU 108 of the communication apparatus 100 determines that the EEE power saving mode is not set.

Figure 5:
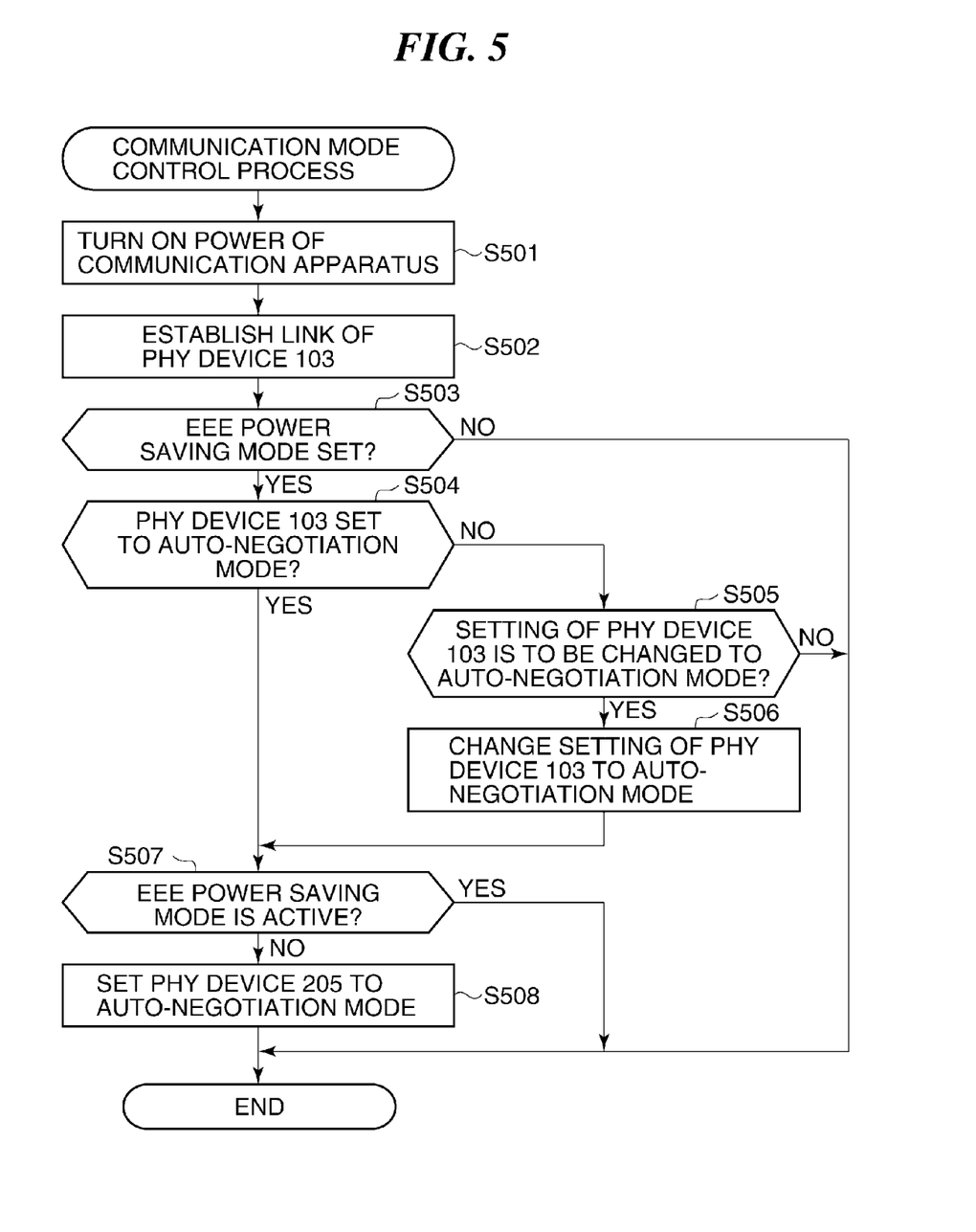
FIG. 5 is a flowchart of a communication mode control process executed by a CPU appearing in FIG. 1.

FIG. 5 is a flowchart of a communication mode control process executed by the CPU 108 in the first embodiment.

First, when the power of the communication apparatus 100 is turned on (step S501), the PHY device 103 establishes a network link with an other-party apparatus (step S502).

Then, the CPU 108 determines whether or not the EEE power saving mode is set (step S503). If the option "ON" has been selected by the user on the FIG. 4B setting screen, the CPU 108 determines that the EEE power saving mode is set, whereas if the option "OFF" has been selected by the user on the FIG. 4B setting screen, the CPU 108 determines that the EEE power saving mode is not set.

If it is determined in the step S503 that the EEE power saving mode is not set (NO to the step S503), the present process is immediately terminated. In this case, the communication apparatus 100 does not operate in the EEE power saving mode.

On the other hand, if it is determined in the step S503 that the EEE power saving mode is set (YES to the step S503), the CPU 108 determines whether or not the PHY device 103 is set to the auto-negotiation mode (step S504). If the option "auto-negotiation" has been selected by the user on the setting screen in FIG. 4A, the CPU 108 determines that the PHY device 103 is set to the auto-negotiation mode, and proceeds to a step S507. On the other hand, if an option corresponding to a communication mode other than "auto-negotiation" has been selected by the user on the setting screen in FIG. 4A, the CPU 108 determines that the PHY device 103 is not set to the auto-negotiation mode.

Figure 8A:
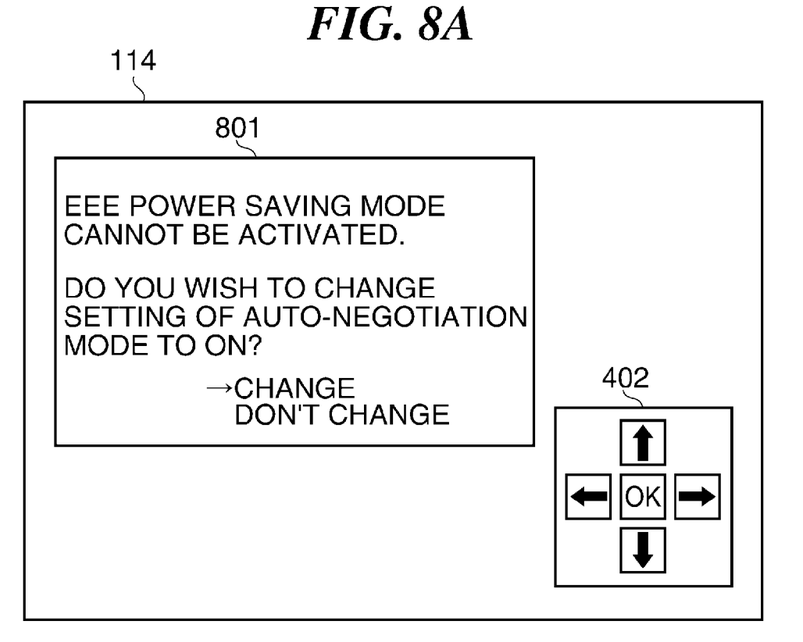
FIG. 8A is a view of a screen for changing an auto-negotiation mode setting.

If it is determined in the step S504 that the PHY device 103 is not set to the auto-negotiation mode (NO to the step S504), the CPU 108 determines in a step S505 whether or not to change the setting of the communication mode of the PHY device 103 to the auto-negotiation mode. In the step S505, the LCD 401 displays a setting screen shown in FIG. 8A. FIG. 8A is a view of a screen for changing an auto-negotiation mode setting. When the user selects an option "change" in a message box 801 in FIG. 8A, the CPU 108 determines that the setting of the PHY device 103 is to be changed to the auto-negotiation mode, and proceeds to a step S506. Then, in the step S506, the CPU 108 changes the setting of the PHY device 103 to the auto-negotiation mode, and proceeds to the step S507. Why the setting of the PHY device 103 is changed to the auto-negotiation mode in the step S506 is that it is essentially required that the communication device 100 has been set to the auto-negotiation mode so as to cause the communication device 100 to operate in the EEE power saving mode.

On the other hand, when the user selects an option "don't change" in the message box 801, the CPU 108 determines that the communication mode of the PHY device 103 is not to be changed to the auto-negotiation mode, and the present process is terminated. In this case, the communication device 100 does not operate in the EEE power saving mode.

In the step S507, the CPU 108 determines whether or not the EEE power saving mode is active. In the present embodiment, even if the EEE power saving mode has been set in the communication device 100, the EEE power saving mode is not necessarily activated. For example, when the HUB 201 is not in the auto-negotiation mode, the EEE power saving mode is not activated. In view of this, in the present embodiment, it is determined in the step S507 whether or not the EEE power saving mode is active.

Next, the determination performed in the step S507 will be described in detail. As described hereinabove with reference to FIG. 3, when the PHY device 103 is linked by the half-duplex communication method when it is in the auto-negotiation mode, it can be determined that the HUB 201 is in the fixed mode, and therefore it can be determined in the step S507 that the EEE power saving mode is not active. As another example, when processing that should be executed if the EEE power saving mode is active (i.e. reduction or cut-off of the supply of electric power to the MAC 104 or reduction of the maximum communication speed of the PHY device 103) is not executed, it can be determined that the HUB 201 is in the fixed mode, and therefore it can be determined in the step S507 that the EEE power saving mode is not active. If the CPU 108 determines in the step S507 that the EEE power saving mode is not active, the CPU 108 proceeds to a step S508. On the other hand, if the CPU 108 determines in the step S507 that the EEE power saving mode is active, the present process is terminated.

In the step S508, the CPU 108 sets the PHY device 205 of the HUB 201 to the auto-negotiation mode. In the step S508, the CPU 108 transmits a command for setting the PHY device 205 to the auto-negotiation mode to the HUB 201, to thereby set the PHY device 205 to the auto-negotiation mode.

Figure 8B:
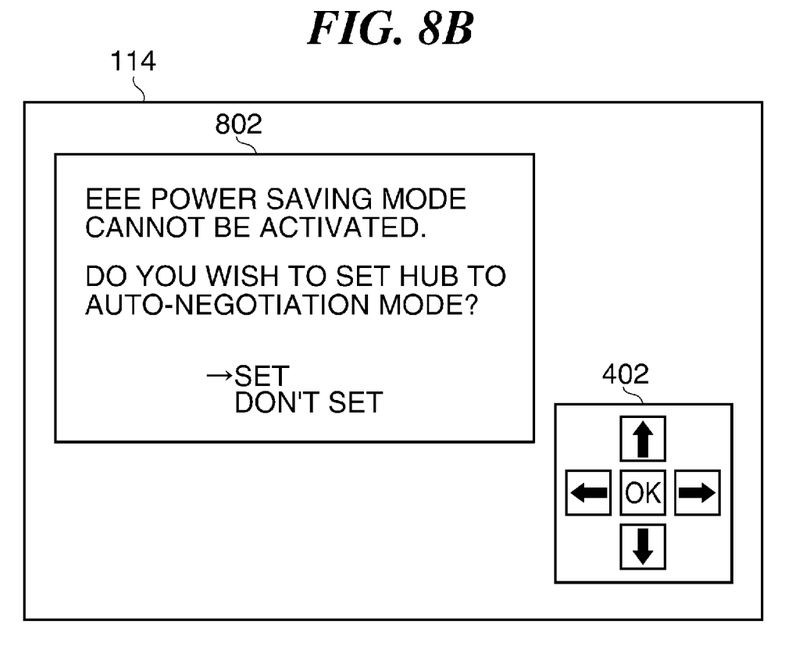
FIG. 8B is a view of a screen for setting an auto-negotiation mode.

Note that a setting screen shown in FIG. 8B may be displayed in the step S508 so as to cause the user to determine whether or not to set the HUB 201 (PHY device 205) to the auto-negotiation mode. FIG. 8B is a view of a screen for setting an auto-negotiation mode. In this case, when the user selects an option "set" in a message box 802 in FIG. 8B, the CPU 108 transmits the command for setting the PHY device 205 to the auto-negotiation mode to the HUB 201.

Although in the present embodiment, the user is caused to determine in the step S505 whether or not to change the setting of the PHY device 103 to the auto-negotiation mode, this is not limitative. Alternatively, when the answer to the question of the step S504 is negative (NO), the CPU 108 may skip the step S505 for determination and jump to the step S506, or in accordance with setting of the EEE power saving mode by the user on the FIG. 4B setting screen, the setting of the communication mode of the communication apparatus 100 may be automatically changed from the fixed mode to the auto-negotiation mode.

As described above, according to the present embodiment, in a case where the EEE power saving mode has been set but is not activated, it is possible to enable the EEE power saving mode by setting the communication apparatus 100 or the HUB 201 to the auto-negotiation mode.

Next, a second embodiment of the present invention will be described. The second embodiment is distinguished from the first embodiment in which the communication apparatus 100 transmits the command for setting the HUB 201 to the auto-negotiation mode to the HUB 201, in that the EEE power saving mode is realized without transmission of the command. The hardware configuration of a communication apparatus according to the present embodiment is the same as that of the communication apparatus according to the first embodiment. Therefore, corresponding elements are denoted by the same reference numerals as used in the first embodiment, and description thereof is omitted.

Figure 6:
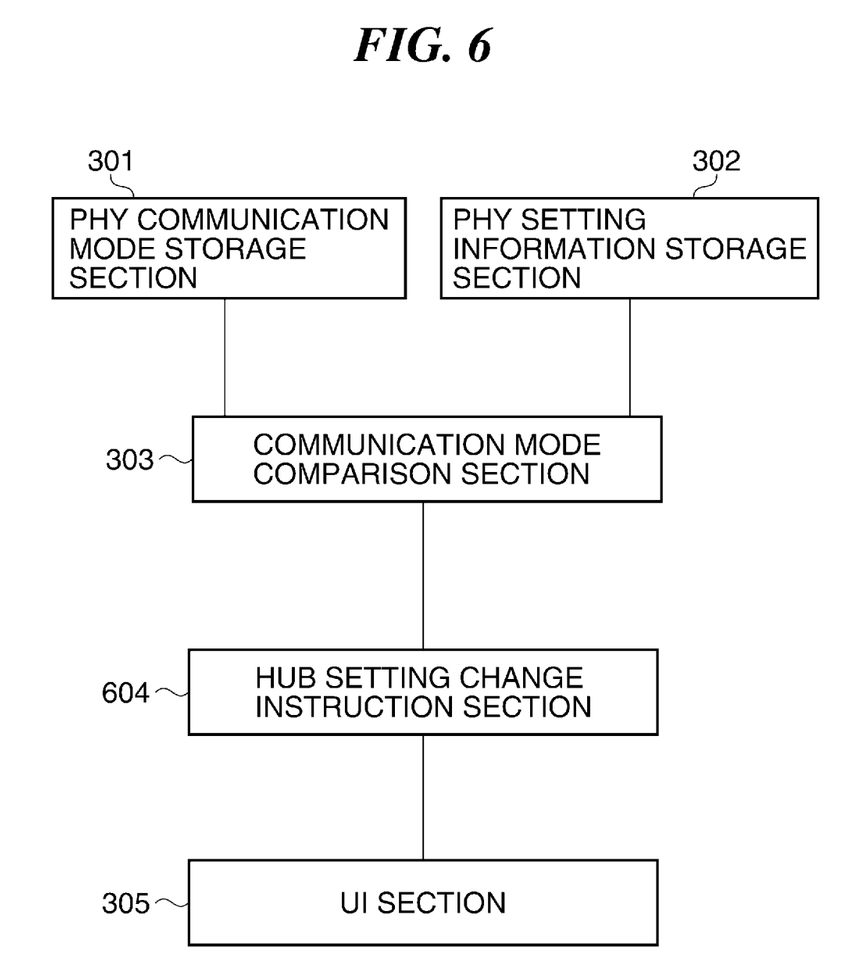
FIG. 6 is a diagram showing the software configuration of a communication apparatus according to a second embodiment of the present invention.

FIG. 6 is a diagram showing the software configuration of the communication apparatus 100 according to the second embodiment.

The software modules of the communication apparatus 100 shown in FIG. 6 include the PHY communication mode storage section 301, the PHY setting information storage section 302, the communication mode comparison section 303, the user interface section 305, and a HUB setting change instruction section 604.

The software configuration shown in FIG. 6 is distinguished from the software configuration shown in FIG. 3 in that the other-party apparatus IP address storage section 306, the packet transmission and reception section 307, and the Web browser connection section 304 are omitted and the HUB setting change instruction section 604 is added.

Each of the PHY communication mode storage section 301, the PHY setting information storage section 302, and the communication mode comparison section 303 performs the same processing as the corresponding section described with reference to FIG. 3. Therefore, description thereof is omitted, and only the HUB setting change instruction section 604 and the user interface section 305 will be described.

When the communication mode comparison section 303 detects a communication mode mismatch, the HUB setting change instruction section 604 issues a message for setting change of the PHY device 205 to the user interface section 305.

This communication mode mismatch is the same as described with reference to FIG. 3. Specifically, the information stored by the PHY setting information storage section 302 indicates the auto-negotiation mode, and the information stored by the PHY communication mode storage section 301 indicates the half-duplex communication method.

The user interface section 305 displays, on the panel 114, the contents of the message for setting change issued by the HUB setting change instruction section 604.

Here, contents indicating a possibility that the PHY device 205 is set to the fixed mode and contents for prompting the user to change the setting of the PHY device 205 to the auto-negotiation mode or changing a LAN port for connection to the HUB 201 are displayed on the panel 114.

This makes it possible, when the communication mode comparison section 303 detects a communication mode mismatch, to prompt the user to change the setting of the PHY device 205.

Figure 7:
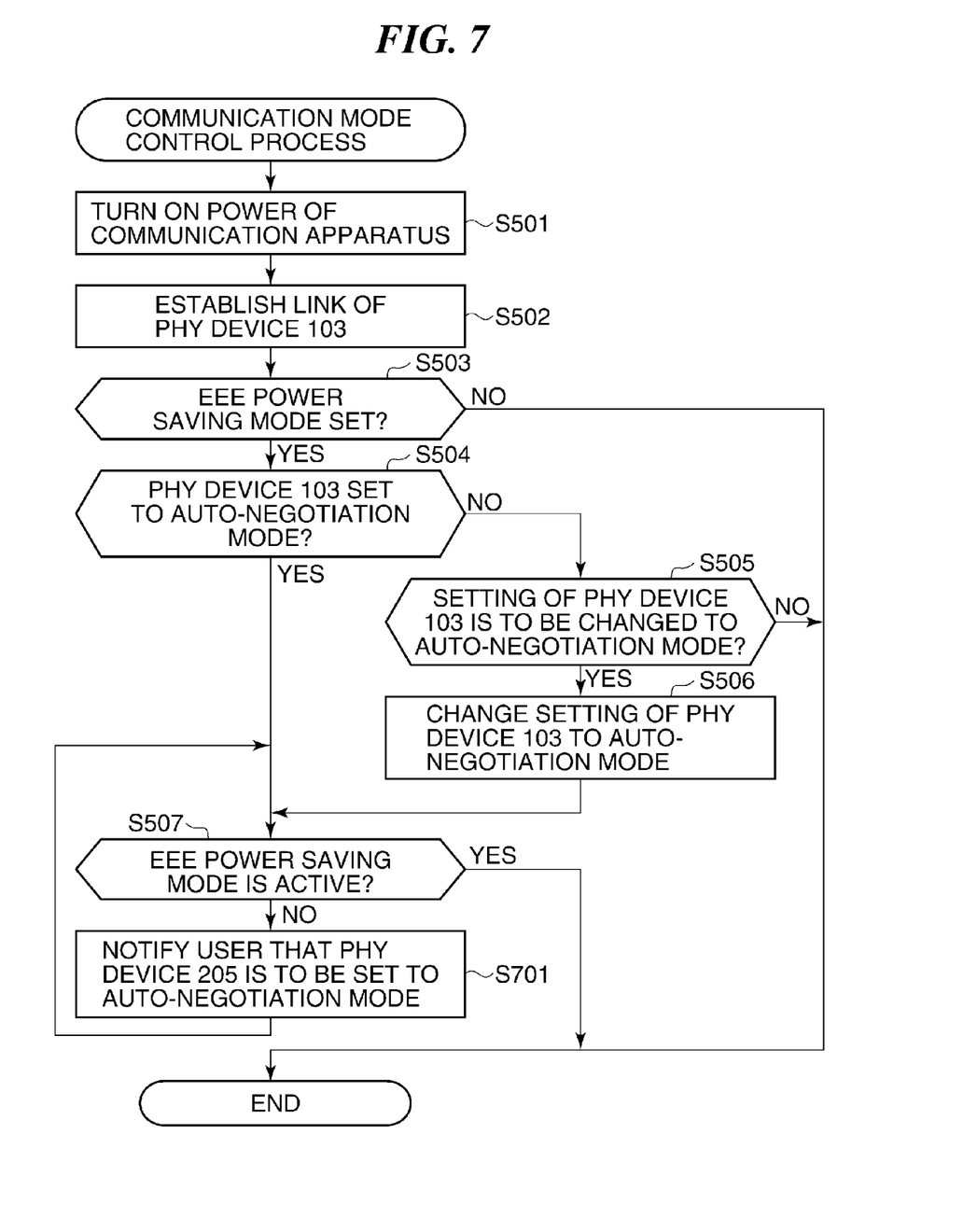
FIG. 7 is a flowchart of a communication mode control process executed by a CPU of the communication apparatus according to the second embodiment.

FIG. 7 is a flowchart of a communication mode control process executed by the CPU 108 in the second embodiment. Steps S501 to S507 of the present communication mode control process are the same as the respective corresponding steps of the communication mode control process described with reference to FIG. 5, and therefore description thereof is omitted.

Figure 9:
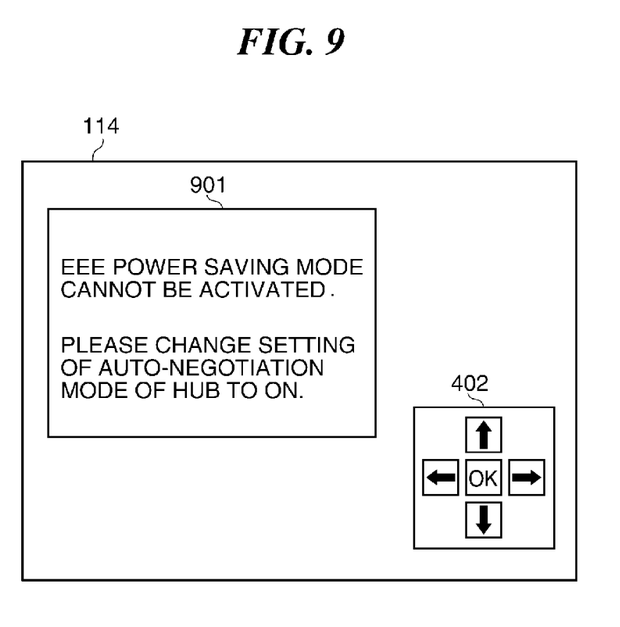
FIG. 9 is a view of a notification screen for prompting a user to change the setting of a communication mode to an auto-negotiation mode.

If the CPU 108 determines in the step S507 that the EEE power saving mode is not active, the CPU 108 proceeds to a step S701. In the step S701, the CPU 108 notifies the user that the PHY device 205 is to be set to the auto-negotiation mode. The notification is realized by causing the LCD 401 to display a notification screen shown in FIG. 9. FIG. 9 is a view of the notification screen for prompting a user to change the setting of the communication mode to the auto-negotiation mode. Referring to FIG. 9, the user, who has checked a message box 901, can easily understand that it is required to set not only the communication apparatus 100 but also the HUB 201 to the auto-negotiation mode so as to activate the EEE power saving mode.

After notifying the user in the step S701 that the PHY device 205 is to be set to the auto-negotiation mode, the communication apparatus 100 waits until the user sets the HUB 201 to the auto-negotiation mode and the EEE power saving mode is activated (i.e. until the answer to the question of the step S507 becomes affirmative (YES)).

As described above, according to the present embodiment, when the EEE power saving mode has been set but is not activated, it is possible to notify the user that the communication apparatus 100 or the HUB 201 is to be set to the auto-negotiation mode.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-108431 filed May 10, 2012, which is hereby incorporated by reference herein in its entirety.

What is claimed is:

1. A communication apparatus configured to communicate with an external apparatus in a case where both the communication apparatus and the external apparatus are configured to communicate using an auto-negotiation mode and a fixed mode, comprising:
   a memory device;
   a processor configured to execute computer executable instructions recorded on the memory device, the computer executable instructions including instructions, that when executed by the processor, cause the communication apparatus to:
   determine whether a power saving function is active, the power saving function being a function that cannot be active unless both the communication apparatus and the external apparatus are operating in the auto-negotiation mode; and
   transmit, to the external apparatus, a changing command for changing a setting of a communication mode of the external apparatus from the fixed mode to the auto-negotiation mode in a case where the external apparatus is operating in the fixed mode and it is determined that the power saving function is not active.

2. The communication apparatus according to claim 1, further comprising a display device configured to display an inquiry screen for inquiring of a user whether to change the setting of the communication mode of the external apparatus to the auto-negotiation mode in the case where it is determined that the power saving function is not active,
   wherein the communication apparatus is caused to transmit, to the external apparatus, the changing command after the setting of the communication mode of the external apparatus is instructed, through the inquiry screen, to be changed to the auto-negotiation mode.

3. The communication apparatus according to claim 1, wherein the computer executable instructions further include instructions, that when executed by the processor, cause the communication apparatus to:
   set whether the power saving function is to be used; and
   set the communication mode of the communication apparatus to any one of the fixed mode and the auto-negotiation mode, and
   wherein the communication apparatus is caused to determine whether the power saving function is active if the power saving function is set to be used and the communication mode of the communication apparatus is set to the auto-negotiation mode.

4. The communication apparatus according to claim 1, wherein the power saving function is a power saving function defined by IEEE 802.3az.

5. A method of controlling a communication apparatus configured to communicate with an external apparatus in a case where both the communication apparatus and the external apparatus are configured to communicate using an auto-negotiation mode and a fixed mode, the method comprising:
   determining whether a power saving function is active, the power saving function being a function that cannot be active unless both the communication apparatus and the external apparatus are operating in the auto-negotiation mode; and transmitting, to the external apparatus, a changing command for changing a setting of a communication mode of the external apparatus from the fixed mode to the auto-negotiation mode in a case where the external apparatus is operating in the fixed mode and it is determined that the power saving function is not active.

6. A non-transitory computer-readable storage medium storing a computer-executable program for causing a computer to execute a method of controlling a communication apparatus configured to communicate with an external apparatus in a case where both the communication apparatus and the external apparatus are configured to communicate using an auto-negotiation mode and a fixed mode, the method comprising:
  determining whether a power saving function is active, the power saving function being a function that cannot be active unless both the communication apparatus and the external apparatus are operating in the auto-negotiation mode; and
  transmitting, to the external apparatus, a changing command for changing a setting of a communication mode of the external apparatus from the fixed mode to the auto-negotiation mode in a case where the external apparatus is operating in the fixed mode and it is determined that the power saving function is not active.

7. The communication apparatus according to claim 1, wherein the external apparatus comprises a HUB.

8. A communication apparatus configured to communicate with an external apparatus in a case where both the communication apparatus and the external apparatus are configured to communicate using an auto-negotiation mode and a fixed mode, comprising:
  a memory device;
  a processor configured to execute computer executable instructions recorded on the memory device, the computer executable instructions including instructions, that when executed by the processor, cause the communication apparatus to:
  determine whether a power saving function is active, the power saving function being a function that cannot be active unless both the communication apparatus and the external apparatus are operating in the auto-negotiation mode; and
  a display device configured to display a notification screen for prompting a user to change a setting of a communication mode of the external apparatus from the fixed mode to the auto-negotiation mode in a case where the external apparatus is operating in the fixed mode and it is determined that the power saving function is not active.

9. The communication apparatus according to claim 8, wherein the computer executable instructions further include instructions, that when executed by the processor, cause the communication apparatus to:
  set whether the power saving function is to be used; and
  set the communication mode of the communication apparatus to any one of the fixed mode and the auto-negotiation mode,
  wherein the communication apparatus is caused to determine whether the power saving function is active if the power saving function is set to be used and the communication mode of the communication apparatus is set to the auto-negotiation mode.

10. The communication apparatus according to claim 8, wherein the power saving function is a power saving function defined by IEEE 802.3az.

11. The communication apparatus according to claim 8, wherein the external apparatus comprises a HUB.

12. A method of controlling a communication apparatus configured to communicate with an external apparatus in a case where both the communication apparatus and the external apparatus are configured to communicate using an auto-negotiation mode and a fixed mode, the method comprising:
  determining whether a power saving function is active, the power saving function being a function that cannot be active unless both the communication apparatus and the external apparatus are operating in the auto-negotiation mode; and
  displaying a notification screen for prompting a user to change a setting of a communication mode of the external apparatus from the fixed mode to the auto-negotiation mode in a case where the external apparatus is operating in the fixed mode and it is determined that the power saving function is not active.

13. A non-transitory computer-readable storage medium storing a computer-executable program for causing a computer to execute a method of controlling a communication apparatus configured to communicate with an external apparatus in a case where both the communication apparatus and the external apparatus are configured to communicate using an auto-negotiation mode and a fixed mode, the method comprising:
  determining whether a power saving function is active, the power saving function being a function that cannot be active unless both the communication apparatus and the external apparatus are operating in the auto-negotiation mode; and
  displaying a notification screen for prompting a user to change a setting of a communication mode of the external apparatus from the fixed mode to the auto-negotiation mode in a case where the external apparatus is operating in the fixed mode and it is determined that the power saving function is not active.

14. A communication apparatus configured to communicate with an external apparatus in a case where both the communication apparatus and the external apparatus are configured to communicate using an auto-negotiation mode and a fixed mode, comprising:
  a memory device;
  a processor configured to execute computer executable instructions recorded on the memory device, the computer executable instructions including instructions, that when executed by the processor, cause the communication apparatus to:
  set whether a power saving function is to be used, the power saving function being a function that cannot be used unless both the communication apparatus and the external apparatus are operating in the auto-negotiation mode;
  set the communication mode of the communication apparatus to any one of the fixed mode and the auto-negotiation mode; and
  transmit, to the external apparatus, a changing command for changing a setting of a communication mode of the external apparatus from the fixed mode to the auto-negotiation mode in a case where the external apparatus is operating in the fixed mode and the power saving function is set to be used, the communication mode of the communication apparatus is set to the auto-negotiation mode, and the communication apparatus and the external apparatus are in communication with each other without the power saving function being active.

15. The communication apparatus according to claim 14, further comprising a display device configured to display an inquiry screen for inquiring of a user whether to change a setting of the communication mode of the external apparatus to the auto-negotiation mode, in the case where the power saving function is set to be used, the communication mode of the communication apparatus is set to the auto-negotiation mode, and the communication apparatus and the external apparatus are in communication with each other without the power saving function being active,
wherein the communication apparatus is caused to transmit, to the external apparatus, the changing command after the setting of the communication mode of the external apparatus is instructed, through the inquiry screen, to be changed to the auto-negotiation mode.

16. The communication apparatus according to claim 14, wherein the power saving function is a power saving function defined by IEEE 802.3az.

17. The communication apparatus according to claim 14, wherein the external apparatus comprises a HUB.

18. A method of controlling a communication apparatus configured to communicate with an external apparatus in a case where both the communication apparatus and the external apparatus are configured to communicate using an auto-negotiation mode and a fixed mode, the method comprising:
setting whether a power saving function is to be used, the power saving function being a function that cannot be used unless both the communication apparatus and the external apparatus are operating in the auto-negotiation mode;
setting the communication mode of the communication apparatus to any one of the fixed mode and the auto-negotiation mode; and
transmitting, to the external apparatus, a changing command for changing a setting of a communication mode of the external apparatus from the fixed mode to the auto-negotiation mode in a case where the external apparatus is operating in the fixed mode and the power saving function is set to be used, the communication mode of the communication apparatus is set to the auto-negotiation mode, and the communication apparatus and the external apparatus are in communication with each other without the power saving function being active.

19. A non-transitory computer-readable storage medium storing a computer-executable program for causing a computer to execute a method of controlling a communication apparatus configured to communicate with an external apparatus in a case where both the communication apparatus and the external apparatus are configured to communicate using an auto-negotiation mode and a fixed mode, the method comprising:
setting whether a power saving function is to be used, the power saving function being a function that cannot be used unless both the communication apparatus and the external apparatus are operating in the auto-negotiation mode;
setting the communication mode of the communication apparatus to any one of the fixed mode and the auto-negotiation mode; and
transmitting, to the external apparatus, a changing command for changing a setting of a communication mode of the external apparatus from the fixed mode to the auto-negotiation mode in a case where the external apparatus is operating in the fixed mode and the power saving function is set to be used, the communication mode of the communication apparatus is set to the auto-negotiation mode, and the communication apparatus and the external apparatus are in communication with each other without the power saving function being active.

20. A communication apparatus configured to communicate with an external apparatus in a case where both the communication apparatus and the external apparatus are configured to communicate using an auto-negotiation mode and a fixed mode, comprising:
a memory device;
a processor configured to execute computer executable instructions recorded on the memory device, the computer executable instructions including instructions, that when executed by the processor, cause the communication apparatus to set whether a power saving function is to be used, the power saving function being a function that cannot be used unless both the communication apparatus and the external apparatus are operating in the auto-negotiation mode, and to set the communication mode of the communication apparatus to any one of the fixed mode and the auto-negotiation mode; and
a display device configured to display a notification screen for prompting a user to change a setting of the communication mode of the external apparatus from the fixed mode to the auto-negotiation mode in a case where the external apparatus is operating in the fixed mode and the power saving function is set to be used, the communication mode of the communication apparatus is set to the auto-negotiation mode, and the communication apparatus and the external apparatus are in communication with each other without the power saving function being active.

21. The communication apparatus according to claim 20, wherein the power saving function is a power saving function defined by IEEE 802.3az.

22. The communication apparatus according to claim 20, wherein the external apparatus comprises a HUB.

23. A method of controlling a communication apparatus configured to communicate with an external apparatus in a case where both the communication apparatus and the external apparatus are configured to communicate using an auto-negotiation mode and a fixed mode, the method comprising:
setting whether a power saving function is to be used, the power saving function being a function that cannot be used unless both the communication apparatus and the external apparatus are operating in the auto-negotiation mode;
setting the communication mode of the communication apparatus to any one of the fixed mode and the auto-negotiation mode; and
displaying a notification screen for prompting a user to change a setting of the communication mode of the external apparatus from the fixed mode to the auto-negotiation mode in a case where the external apparatus is operating in the fixed mode and the power saving function is set to be used, the communication mode of the communication apparatus is set to the auto-negotiation mode, and the communication apparatus and the external apparatus are in communication with each other without the power saving function being active.

24. A non-transitory computer-readable storage medium storing a computer-executable program for causing a computer to execute a method of controlling a communication apparatus configured to communicate with an external apparatus in a case where both the communication apparatus and the external apparatus are configured to communicate using an auto-negotiation mode and a fixed mode, the method comprising:

setting whether a power saving function is to be used, the power saving function being a function that cannot be used unless both the communication apparatus and the external apparatus are operating in the auto-negotiation mode;

setting the communication mode of the communication apparatus to any one of the fixed mode and the auto-negotiation mode; and     displaying a notification screen for prompting a user to change a setting of the communication mode of the external apparatus from the fixed mode to the auto-negotiation mode in a case where the external apparatus is operating in the fixed mode and the power saving function is set to be used, the communication mode of the communication apparatus is set to the auto-negotiation mode, and the communication apparatus and the external apparatus are in communication with each other without the power saving function being active.

* * * * *